(12) United States Patent
Chen et al.

(10) Patent No.: US 10,206,203 B2
(45) Date of Patent: Feb. 12, 2019

(54) CONTROL SIGNALING TRANSMISSION AND DEMODULATION METHOD, SYSTEM AND TERMINAL

(71) Applicant: ZTE Corporation, Shenzhen, Guangdong Province (CN)

(72) Inventors: Yijian Chen, Shenzhen (CN); Bo Dai, Shenzhen (CN); Zhisong Zuo, Shenzhen (CN); Yu Ngok Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 254 days.

(21) Appl. No.: 14/386,207

(22) PCT Filed: Mar. 18, 2013

(86) PCT No.: PCT/CN2013/072830
§ 371 (c)(1),
(2) Date: Sep. 18, 2014

(87) PCT Pub. No.: WO2013/139246
PCT Pub. Date: Sep. 26, 2013

(65) Prior Publication Data
US 2015/0049733 A1    Feb. 19, 2015

(30) Foreign Application Priority Data

Mar. 19, 2012   (CN) .......................... 2012 1 0072688
Mar. 21, 2012   (CN) .......................... 2012 1 0076261

(51) Int. Cl.
*H04W 72/04*   (2009.01)
*H04L 5/00*    (2006.01)
(Continued)

(52) U.S. Cl.
CPC ......... *H04W 72/042* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

2013/0064216 A1*  3/2013  Gao ..................... H04L 5/0016
                                                  370/330

FOREIGN PATENT DOCUMENTS

| CN | 102395206 A | 3/2012 |
| WO | 2010058245 A1 | 5/2010 |
| WO | 2013037059 A1 | 3/2013 |

OTHER PUBLICATIONS

EP Search Report dated Mar. 24, 2015 in corresponding European application (No. 13764660).
(Continued)

*Primary Examiner* — Mohammad S Adhami
(74) *Attorney, Agent, or Firm* — McClure, Qualey & Rodack, LLP (57) ABSTRACT

The present document discloses control signaling transmission and demodulation method, system and terminal. The control signaling transmission method includes: a base station transmitting control signaling using different transmission technologies on available transmission resources in the second control signaling transmission area in the same RB. With present document, by configuring a pilot frequency port and dividing the transmission resources in the second control signaling transmission area in the RB, the control signaling of a plurality of UEs using different transmission technologies can be transmitted on the available transmission resources in the same RB, thus fully utilizing the transmission resources in the RB, improving resource utilization rate, enhancing control signaling capacity, and supporting the control signaling of more users.

12 Claims, 4 Drawing Sheets

(51) Int. Cl.
    *H04W 88/06* (2009.01)
    *H04W 88/10* (2009.01)
    *H04L 1/06* (2006.01)

(52) U.S. Cl.
    CPC .......... *H04L 1/0606* (2013.01); *H04L 5/0023* (2013.01); *H04L 5/0051* (2013.01); *H04W 88/06* (2013.01); *H04W 88/10* (2013.01)

(56) References Cited

OTHER PUBLICATIONS

LG Electronics: "Considerations on RS for E-PDCCH"; Discussion and Decision; 3GPP TSG RAN WG1 Meeting #68, Dresden, Germany, Feb. 6-10, 2012; pp. 1-3.
ZTE: "Discussion on DMRS based enhanced PDCCH transmission"; Discussion and Decision; 3GPP TSG RAN WG1 Meeting #68; Dresden, Germany. Feb. 6-10, 2012: pp. 1-5.
3GPP TSG RAN WG1 Meeting #68 R1-120681, Feb. 10, 2012. ; "Configuration of localized and distributed transmission for E-PDCCH"; pp. 1-3.
3GPP TSG RAN WG1 Meeting #68 R1-120186, Feb. 10, 2012. ; "DMRS based E-PDCCH Transmission Schemes"; pp. 1-6.
3GPP TSG RAN WG1 Meeting #67 R1-114302, Nov. 18, 2011. ; "DM-RS Design for E-PDCCH in Rel-11"; pp. 1-3.
EP Search Report dated Nov. 15, 2017 in EP application No. 13764660.0-1874.

\* cited by examiner

CONTROL SIGNALING TRANSMISSION AND DEMODULATION METHOD, SYSTEM AND TERMINAL

TECHNICAL FIELD

The present document relates to the field of mobile communication technologies, and in particular, to a control signaling transmission and demodulation method, system and terminal.

BACKGROUND OF THE RELATED ART

In the Long Term Evolution (LTE for short) system and LTE-Advanced (LTE-A for short) system, control signaling of the downlink physical layer contains downlink transmission related downlink grant (DL grant) information which needs to be known by the terminal and uplink transmission related uplink grant (UL grant) information which needs to be known by the UE, and such control signaling of the physical layer is transmitted on the Physical Downlink Control Channel (PDCCH for short).

In the Release (R for short) 8/9 of the LTE system and R10 of the LTE-A system, the PDCCH for transmitting the control signaling of the physical layer is generally configured to be transmitted on first N Orthogonal Frequency Division Multiplexing (OFDM) symbols, which are referred to as a control signaling transmission area. In the present document, in order to be distinguished from the newly added control signaling transmission area of the new release, the control signaling transmission area of the R8/9/10 is referred to as a first control signaling transmission area.

Available transmission resources in the first Control signaling transmission area are divided into multiple resource units of Control Channel Elements (CCEs), the occupied resources of the control information are allocated with the CCE being a unit, and the resource unit of CCE here can also be further subdivided into multiple Resource Element Groups (REGs), wherein, one CCE is comprised of multiple discontinuous REGs, and in general, 9 REGs constitute one CCE, and each REG is comprised of multiple basic resource units.

It can be seen that the control signaling transmission resources allocated by a user are not continuous, which brings a lot of difficulties in implementing the closed-loop precoding technique in the multi-antenna system, such that the control signaling area can only use the diversity technology, and it is difficult for it to use the closed-loop precoding technique. The primary reason is that there is a great design difficulty in the design of the demodulation pilot and the feedback of the channel state information for the first precoding area, and therefore, all the control signaling in the existing releases only supports discontinuous resource transmission and diversity technologies.

In the releases after R10, in order to enhance the transmission capacity of the control channel and support control signaling of more users, the design considers to open up a new control channel area, and control signaling transmission resources of the same UE can be continuous time-frequency resources, to support the dedicated demodulation pilot based single-layer transmission technology (i.e., the closed-loop precoding technology), thus improving the transmission performance of the control information.

Figure 1:
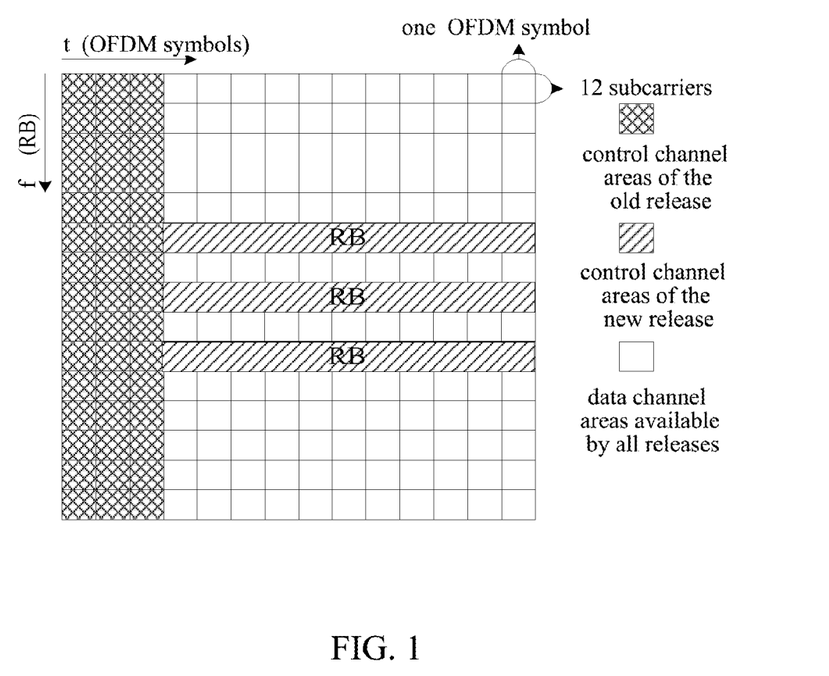
FIG. 1 is a diagram of a control signaling area.

The new and old releases of the control signaling area are as shown in FIG. 1. For the new release of the control signaling, a part of transmission resources are set aside from the PDSCH transmission area of the original R8/9/10 to be used as the second control signaling transmission area, which can support the closed-loop precoding technology when the control signaling is transmitted, thus enhancing control signaling capacity and supporting control signaling of more users.

Here, in the second control signaling transmission area, the dedicated demodulation pilot (DMRS) in the R10 can be reused to demodulate the control signaling, which well supports the precoding technique. In addition, for the second control signal transmission area, RB is taken as the unit, which can well perform interference coordination.

At the same time, considering the robustness of the transmission and the condition that there is no channel information, in the second control signaling transmission area, DMRS can also support the open-loop diversity technology, such as SFBC technology.

Figure 2:
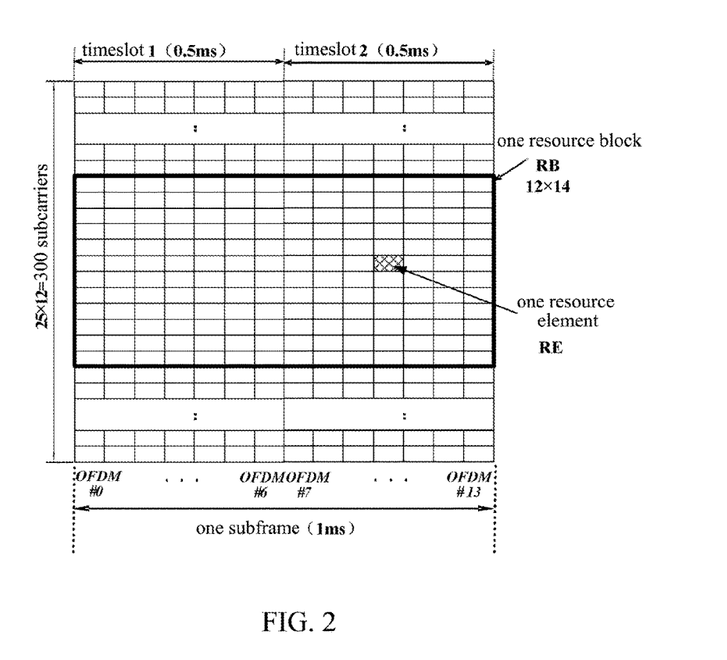
FIG. 2 is a diagram of resources of an LTE-A system.

In order to better understand the background of the present document, the resource definition of the LTE-A will be introduced simply as below: one Resource Element (RE for short) of the LTE is a sub-carrier on one OFDM symbol, while a downlink physical Resource Block (RB for short) is comprised of 12 continuous sub-carriers and continuous 14 (which is 12 when the extended cyclic prefix is used) OFDM symbols, which is 180 kHz in the frequency domain and a time length of one general slot in the time domain, as shown in FIG. 2 (a 5M system). The LTE/LTE-A system performs allocation with a resource block being a basic unit when the resources are allocated.

The second control signaling transmission area mentioned above can support the closed-loop precoding technique and the open-loop diversity technology, and in the related art, the transmission areas of such two transmission technologies as the precoding technique and the diversity technology are transmitted in different RBs respectively, because the diversity technology requires the DMRS not to be precoded and requires multiple UEs to share pilots, while the closed-loop precoding does not allow sharing pilot ports and needs to perform different precodings on different pilot ports and different UEs according to channel information of various UEs.

Figure 3A:
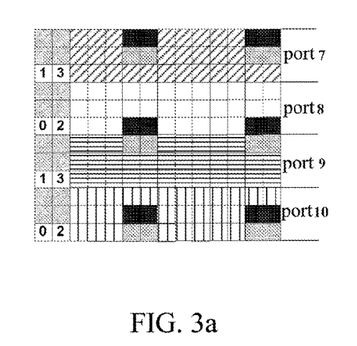
FIGS. 3a and 3b are diagrams of RB resource allocation of closed-loop precoding.
Figure 3B:
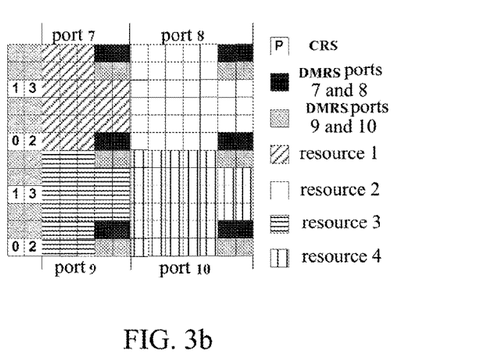

An example of existing technology is that available transmission resources (RBC-1) in the second control area of RB1 use closed-loop precoding, and multiplex 4 users, as shown in FIG. 3a or 3b. The second control area resources in the RB are divided into 4 parts, each user occupies one part of resources, and each part of resources corresponds to one pilot port. Ports 7 and 8 share some time-frequency resources, and Ports 9 and 10 share some time-frequency resources. Code division is performed between two ports sharing time-frequency resources, to keep orthogonality.

Figure 4:
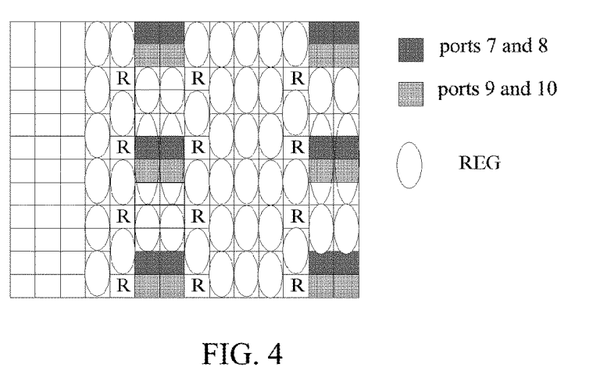
FIG. 4 is a diagram of RB resource allocation using a diversity technology.

Available transmission resources (RBC-2) in the second control area of the RB2 use the diversity technology, and RB2 is divided into multiple eREGs, as shown in FIG. 4, each REG contains two REs, resources are allocated to multiple diversity users with the eREG being a unit, and multiple users using transmission diversity technology are multiplexed in the RB.

In conclusion, the following problems exist in the related art: as there may sometimes be few users scheduled in the system, whether it is the diversity or the closed-loop precoding, there may be a condition that the resources in the RB are used insufficiently, the utilization rate of the resources is not high, and the waste of the resources is serious especially for the diversity technology when there are few users.

SUMMARY OF THE INVENTION

The technical problem to be solved by the present document is to provide a control signaling transmission and demodulation method, system and terminal, which can transmit the control signaling of a plurality of UEs of different transmission technologies on the available transmission resources in the same RB, thus effectively improving utilization rate of the transmission resources.

In order to solve the above technical problem, the present document provides a control signaling transmission method, comprising:

a base station transmitting control signaling using different transmission technologies on available transmission resources in a second control signaling transmission area in a same Resource Block (RB).

The different transmission technologies include:

a dedicated demodulation pilot based single-layer transmission technology; and a diversity technology.

Wherein, controlling signaling of one or more User Equipments (UEs) using the diversity technology shares two of pilot ports, a port 7, a port 8, a port 9 and a port 10, as demodulation pilot ports of the controlling signaling; and one or more User Equipments (UEs) using the dedicated demodulation pilot based single-layer transmission technology use one or both of remaining two of the pilot ports, the port 7, the port 8, the port 9 and the port 10, as demodulation pilot ports of the controlling signaling.

The two pilot ports shared by the UEs using the diversity technology are the port7 and the port9 or the port8 and the port10.

All the UEs of different transmission technologies use a unified minimum control signaling resource unit eREG, which is two Resource Elements (REs).

The base station divides the available transmission resources in the second control signaling transmission area in the RB into a plurality of resource sets, allocates one or more resource sets to each UE, and transmits the control signaling of the UEs on the resource sets allocated to the UEs.

The present document further provides a control signaling demodulation method, comprising:

a User Equipment (UE) detecting occupied transmission resources in a Resource Block (RB), and demodulating control signaling transmitted by a base station on the transmission resources in a second control signaling transmission area in the RB according to corresponding relationships between the occupied transmission resources and pilot ports.

The base station divides the available transmission resources in the second control signaling transmission area in the RB into one or more resource sets; and the corresponding relationships between the occupied transmission resources and the pilot ports are corresponding relationships between the occupied resource sets and the pilot ports.

The base station divides the available transmission resources in the second control signaling transmission area in the RB into 4 resource sets, and the corresponding relationships between the occupied transmission resources and the pilot ports are that when the transmission is performed using a dedicated demodulation pilot based single-layer transmission technology, if the UE occupies one resource set in the RB, the occupied resource sets 1, 2, 3 and 4 correspond to a port a, a port b, a port c and a port d respectively; and if the UE occupies two resource sets in the RB, the occupied resource sets 1 and 2 correspond to the port a or the port b, and the occupied resource sets 3 and 4 correspond to the port d or the port c;

wherein, the a, b, c and d are one of pilot port numbers 7, 8, 9 and 10 respectively, and are different from each other.

When the transmission is performed using the dedicated demodulation pilot based single-layer transmission technology, if the UE occupies two resource sets in the RB, the occupied resource sets 1 and 2 correspond to the port a, and the occupied resources 3 and 4 correspond to the port d;

or the occupied resource sets 1 and 2 correspond to the port c, and the occupied resources 3 and 4 correspond to the port b;

wherein, the a, b, c and d are one of the pilot port numbers 7, 8, 9 and 10 respectively, and are different from each other.

The base station divides the available transmission resources in the second control signaling transmission area in the RB into 4 resource sets, and the corresponding relationships between the occupied transmission resources and the pilot ports are that when the transmission is performed using a dedicated demodulation pilot based single-layer transmission technology, if the UE occupies one resource set in the RB, the occupied resource sets 1, 2, 3 and 4 correspond to the port a, the port b, the port c and the port d respectively; and when the diversity technology is used, if not all the transmission resources in the resource sets 1 and 2 are occupied, the occupied resource sets 1 and 2 correspond to the port a and the port b respectively; and if not all the transmission resources in the resource sets 3 and 4 are occupied, the occupied resource sets 3 and 4 correspond to the port c and the port d respectively;

wherein, the a, b, c and d are one of the pilot port numbers 7, 8, 9 and 10 respectively, and are different from each other.

When the diversity technology is used, if all the transmission resources in the resource sets 1 and 2 are occupied, the occupied resource sets 1 and 2 correspond to the port a and the port b, or the port c and the port d respectively; and if all the transmission resources in the resource sets 3 and 4 are occupied, the occupied resource sets 3 and 4 correspond to the port a and the port b, or the port c and the port d respectively.

When the diversity technology is used, if all the transmission resources in the resource sets 1 and 2 are occupied, the UE determines whether the occupied resource sets 1 and 2 correspond to the port a and the port b, or the port c and the port d respectively according to an indication from the base station; and if all the transmission resources in the resource sets 3 and 4 are occupied, the UE determines whether the occupied resource sets 3 and 4 correspond to the port a and the port b, or the port c and the port d respectively according to an indication from the base station.

The a, b, c, and d respectively are 7, 8, 9, 10; or 7, 9, 8, 10; or 8, 7, 10, 9; or 9, 7, 10, 8; or 9, 10, 7, 8; or 8, 10, 7, 9; or 10, 9, 8, 7; or 10, 8, 9, 7.

The base station divides the available transmission resources in the second control signaling transmission area in the RB into one or more resource sets; and in a condition of allocating a same number of resource sets in different RBs, there are different corresponding relationships between the pilot resources and the resource sets in the different RBs.

That there are following different corresponding relationships between the pilot resources and the resource sets in the different RBs refers to:

the corresponding relationships between the pilot resources and the resource sets in adjacent RBs are different.

When the base station divides the available transmission resources in the second control signaling transmission area in the RB into 4 resource sets, there are following two different corresponding relationships between the pilot resources and the resource sets in the different RBs:

when one resource set in the RB is occupied, the occupied resource sets 1, 2, 3 and 4 correspond to the pilot ports, the port a, the port b, the port c and the port d, respectively; and when one resource set in the RB is occupied, the occupied resource sets 1, 2, 3 and 4 correspond to the pilot ports, the port b, the port a, the port d and the port c, respectively;

wherein, the a, b, c and d are one of the pilot port numbers 7, 8, 9 and 10 respectively, and are different from each other.

When the base station divides the available transmission resources in the second control signaling transmission area in the RB into 4 resource sets, there are following two different corresponding relationships between the pilot resources and the resource sets in the different RBs:

when two resource sets in the RB are occupied, the occupied resource sets 1 and 2 correspond to the port a, and the occupied resource sets 3 and 4 correspond to the port d; and when two resource sets in the RB are occupied, the occupied resource sets 1 and 2 correspond to the port b, and the occupied resource sets 3 and 4 correspond to the port c;

wherein, the a, b, c and d are one of the pilot port numbers 7, 8, 9 and 10 respectively, and are different from each other.

When the base station divides the available transmission resources in the second control signaling transmission area in the RB into 4 resource sets, there are following four different corresponding relationships between the pilot resources and the resource sets in the different RBs:

when one resource set in the RB is occupied, the occupied resource sets 1, 2, 3 and 4 correspond to the pilot ports, the port a, the port b, the port c, and the port d, respectively;

when one resource set in the RB is occupied, the occupied resource sets 1, 2, 3 and 4 correspond to the pilot ports, the port b, the port a, the port d, and the port c, respectively;

when one resource set in the RB is occupied, the occupied resource sets 1, 2, 3 and 4 correspond to the pilot ports, the port c, the port d, the port a, and the port b, respectively; and when one resource set in the RB is occupied, the occupied resource sets 1, 2, 3 and 4 correspond to the pilot ports, the port d, the port c, the port b, and the port a, respectively;

wherein, the a, b, c and d are one of the pilot port numbers 7, 8, 9 and 10 respectively, and are different from each other.

When the base station divides the available transmission resources in the second control signaling transmission area in the RB into 4 resource sets, there are following four different corresponding relationships between the pilot resources and the resource sets in the different RBs:

when two resource sets in the RB are occupied, the occupied resource sets 1 and 2 correspond to the port a, and the occupied resource sets 3 and 4 correspond to the port d;

when two resource sets in the RB are occupied, the occupied resource sets 1 and 2 correspond to the port b, and the occupied resource sets 3 and 4 correspond to the port c;

when two resource sets in the RB are occupied, the occupied resource sets 1 and 2 correspond to the port d, and the occupied resource sets 3 and 4 correspond to the port a; and when two resource sets in the RB are occupied, the occupied resource sets 1 and 2 correspond to the port c, and the occupied resource sets 3 and 4 correspond to the port b;

wherein, the a, b, c and d are one of the pilot port numbers 7, 8, 9 and 10 respectively, and are different from each other.

The base station divides the available transmission resources in the second control signaling transmission area in the RB into one or more resource sets; and in a condition of allocating the same number of resource sets in different subframes, there are different corresponding relationships between the pilot resources and the resource sets in the different subframes.

That there are following different corresponding relationships between the pilot resources and the resource sets in the different subframes refers to that:

the corresponding relationships between the pilot resources and the resource sets in adjacent subframes are different.

When the base station divides the available transmission resources in the second control signaling transmission area in the RB into 4 resource sets, there are following two different corresponding relationships between the pilot resources and the resource sets in the different subframes:

when one resource set in the RB is occupied, the occupied resource sets 1, 2, 3 and 4 correspond to the pilot ports, the port a, the port b, the port c and the port d, respectively; and when one resource set in the RB is occupied, the occupied resource sets 1, 2, 3 and 4 correspond to the pilot ports, the port b, the port a, the port d and the port c, respectively;

wherein, the a, b, c and d are one of the pilot port numbers 7, 8, 9 and 10 respectively, and are different from each other.

When the base station divides the available transmission resources in the second control signaling transmission area in the RB into 4 resource sets, there are following two different corresponding relationships between the pilot resources and the resource sets in the different subframes:

when two resource sets in the RB are occupied, the occupied resource sets 1 and 2 correspond to the port a, and the occupied resource sets 3 and 4 correspond to the port d; and when two resource sets in the RB are occupied, the occupied resource sets 1 and 2 correspond to the port b, and the occupied resource sets 3 and 4 correspond to the port c;

wherein, the a, b, c and d are one of the pilot port numbers 7, 8, 9 and 10 respectively, and are different from each other.

When the base station divides the available transmission resources in the second control signaling transmission area in the RB into 4 resource sets, there are following four different corresponding relationships between the pilot resources and the resource sets in the different subframes:

when one resource set in the RB is occupied, the occupied resource sets 1, 2, 3 and 4 correspond to the pilot ports, the port a, the port b, the port c, and the port d, respectively;

when one resource set in the RB is occupied, the occupied resource sets 1, 2, 3 and 4 correspond to the pilot ports, the port b, the port a, the port d, and the port c, respectively;

when one resource set in the RB is occupied, the occupied resource sets 1, 2, 3 and 4 correspond to the pilot ports, the port c, the port d, the port a, and the port b, respectively; and when one resource set in the RB is occupied, the occupied resource sets 1, 2, 3 and 4 correspond to the pilot ports, the port d, the port c, the port b, and the port a, respectively;

wherein, the a, b, c and d are one of the pilot port numbers 7, 8, 9 and 10 respectively, and are different from each other.

When the base station divides the available transmission resources in the second control signaling transmission area in the RB into 4 resource sets, there are following four different corresponding relationships between the pilot resources and the resource sets in the different subframes:

when two resource sets in the RB are occupied, the occupied resource sets 1 and 2 correspond to the port a, and the occupied resource sets 3 and 4 correspond to the port d;

when two resource sets in the RB are occupied, the occupied resource sets 1 and 2 correspond to the port b, and the occupied resource sets 3 and 4 correspond to the port c;

when two resource sets in the RB are occupied, the occupied resource sets 1 and 2 correspond to the port d, and the occupied resource sets 3 and 4 correspond to the port a; and when two resource sets in the RB are occupied, the occupied resource sets 1 and 2 correspond to the port c, and the occupied resource sets 3 and 4 correspond to the port b;

wherein, the a, b, c and d are one of the pilot port numbers 7, 8, 9 and 10 respectively, and are different from each other.

In addition, the present document further provides a control signaling transmission system, applied in a base station, comprising: a transmission resource mapping module and a control signaling transmission module, wherein, the transmission resource mapping module is configured to transmit control signaling using different transmission technologies on available transmission resources in a second control signaling transmission area in a same Resource Block (RB); wherein, the different transmission technologies include a dedicated demodulation pilot based single-layer transmission technology and a diversity technology; and the control signaling transmission module is configured to transmit the control signaling to a User Equipment (UE).

The transmission resource mapping module is configured to perform mapping by means of that:

controlling signaling of one or more UEs using the diversity technology shares two of pilot ports, a port7, a port8, a port9 and a port10, as demodulation pilot ports of the controlling signaling; and one or more UEs using the dedicated demodulation pilot based single-layer transmission technology use one or both of remaining two of the pilot ports, the port7, the port8, the port9 and the port10, as demodulation pilot ports of the controlling signaling.

The transmission resource mapping module is further configured to divide the available transmission resources in the second control signaling transmission area in the RB into a plurality of resource sets, allocate one or more resource sets to each UE, and map the control signaling of the UEs onto the resource sets allocated to the UEs.

The present document further provides a terminal, comprising a channel detection module and a control signaling demodulation module, wherein, the channel detection module is configured to detect occupied transmission resources in a Resource Block (RB); and the control signaling demodulation module is configured to demodulate control signaling transmitted by a base station on the transmission resources in a second control signaling transmission area in the RB according to corresponding relationships between the occupied transmission resources and pilot ports.

The corresponding relationships between the occupied transmission resources and the pilot ports are the following corresponding relationships between the occupied resource sets and the pilot ports:

when the transmission is performed using a dedicated demodulation pilot based single-layer transmission technology, if the UE occupies one resource set in the RB, the occupied resource sets 1, 2, 3 and 4 correspond to a port a, a port b, a port c and a port d respectively; and if the UE occupies two resource sets in the RB, the occupied resource sets 1 and 2 correspond to the port a or the port b, and the occupied resource sets 3 and 4 correspond to the port d or the port c;

wherein, the a, b, c and d are one of pilot port numbers 7, 8, 9 and 10 respectively, and are different from each other.

The corresponding relationships between the occupied transmission resources and the pilot ports are the following corresponding relationships between the occupied resource sets and the pilot ports:

when a diversity technology is used, if not all the transmission resources in the resource sets 1 and 2 are occupied, the occupied resource sets 1 and 2 correspond to the port a and the port b respectively; and if not all the transmission resources in the resource sets 3 and 4 are occupied, the occupied resource sets 3 and 4 correspond to the port c and the port d respectively; and when the diversity technology is used, if all the transmission resources in the resource sets 1 and 2 are occupied, the occupied resource sets 1 and 2 correspond to the port a and the port b, or the port c and the port d respectively; and if all the transmission resources in the resource sets 3 and 4 are occupied, the occupied resource sets 3 and 4 correspond to the port a and the port b, or the port c and the port d respectively;

wherein, the a, b, c and d are one of the pilot port numbers 7, 8, 9 and 10 respectively, and are different from each other.

When the diversity technology is used, if all the transmission resources in the resource sets 1 and 2 are occupied, the UE determines whether the occupied resource sets 1 and 2 correspond to the port a and the port b, or the port c and the port d respectively according to an indication from the base station; and if all the transmission resources in the resource sets 3 and 4 are occupied, the UE determines whether the occupied resource sets 3 and 4 correspond to the port a and the port b, or the port c and the port d respectively according to an indication from the base station.

The control signaling demodulation module is further configured to demodulate control signaling in different RBs according to different corresponding relationships between the pilot resources and the resource sets.

The control signaling demodulation module is further configured to demodulate control signaling in different subframes according to different corresponding relationships between the pilot resources and the resource sets.

The present document proposes a control signaling transmission and demodulation scheme, which, by configuring pilot ports and dividing the transmission resources in the second control signaling transmission area in the RB, implement transmission of the control signaling of multiple UEs of different transmission technologies on the available transmission resources in the same RB, thus fully utilizing the transmission resources in the RB, improving resource utilization rate, enhancing control signaling capacity, and supporting the control signaling of more users.

BRIEF DESCRIPTION OF DRAWINGS

The accompanying drawings illustrated here are used to provide further understanding of the present document and constitute a part of the present application, and the illustrative embodiments of the present document and the description thereof are used to explain the present document and do not constitute an improper limit on the present document. In the accompanying drawings.

PREFERRED EMBODIMENTS OF THE INVENTION

The embodiments provide a control signaling transmission method, which uses the following schemes.

A base station transmits control signaling of a plurality of UEs using two different transmission technologies on available transmission resources in a second control signaling transmission area in a RB.

The different transmission technologies include: a dedicated demodulation pilot based single-layer transmission technology (i.e., a precoding technology) and a diversity technology (such as an Alamouti coding diversity technology)

One or more UEs using the diversity technology share two DMRS ports of port 7, port 8, port 9 and port 10, and a UE using the precoding technology uses the remaining one or two DMRS ports of port 7, port 8, port 9 and port 10.

The pilot ports used by the UE using the diversity technology are port 7 and port 9 or port 8 and port 10.

The UEs of different transmission technologies use a unified minimum control signaling resource unit eREG, which are two Resource Elements (REs).

The base station divides the available transmission resources in the second control signaling transmission area in the RB into a plurality of (preferably, 4) resource sets, allocates one or more resource sets to each UE, and transmits the control signaling of the UEs on the resource sets allocated to the UEs.

The embodiments further provide a control signaling demodulation method, comprising:

a UE detecting occupied transmission resources in a RB, and demodulating control signaling transmitted by the base station on the transmission resources in a second control signaling transmission area in the RB according to corresponding relationships between the occupied transmission resources and pilot ports.

The base station divides the available transmission resources in the second control signaling transmission area in the RB into one or more (preferably, 4) resource sets.

The corresponding relationships between the occupied transmission resources and the pilot ports are corresponding relationships between the occupied resource sets and the pilot ports.

Specifically, the corresponding relationships between the ports and the resource sets of the closed-loop precoding and the corresponding relationships between the ports and the resource sets of the transmission diversity can be shown in table 1 below.

TABLE 1

|  |  | Number of resource sets occupied by the UE in the RB | | |
|---|---|---|---|---|
|  |  | 1 Resource Set | 2 Resources | 4 Resource sets |
| Closed-loop precoding | Resource Set 1 | Port a | Port a or b | Port 7 or 8 |
|  | Resource Set 2 | Port b |  |  |
|  | Resource Set 3 | Port c | Port d or c |  |
|  | Resource Set 4 | Port d |  |  |

TABLE 1-continued

|  |  | Number of eREGs occupied by one ePDCCH in a pair of RBs | |
|---|---|---|---|
|  |  | non-empty | empty |
| Transmission diversity | eREGs in resource sets 1 and 2 | Ports a and b | Ports a and b or Ports c and d |
|  | eREGs in resource sets 3 and 4 | Ports c and d |  |

Wherein, a, b, c and d may typically be 7, 8, 9 and 10 or 7, 9, 8 and 10 or 8, 7, 10 and 9 or 9, 7, 10 and 8. As shown in table 1 above, only if the corresponding relationships between the ports and the resource sets of the closed-loop precoding cooperate with the corresponding relationships between the ports and the resource sets of the transmission diversity, both can be multiplexed in one RB; otherwise, it will results in a conflict of pilots.

Then, only if the occupation of one resource set cooperates with the occupation of two resource sets, the flexible transmission can be performed well, without resulting in a conflict of pilot ports.

In addition, in a condition of allocating the same number of resource sets in different RBs, there are different corresponding relationships between the pilot resources and the resource sets in the different RBs.

In addition, in a condition of allocating the same number of resource sets in different subframes, there are different corresponding relationships between the pilot resources and the resource sets in the different subframes.

In order to make the purpose, technical schemes and advantages of the present document more clear and apparent, the embodiments of the present document will be illustrated in detail hereinafter in conjunction with accompanying drawings. It should be illustrated that, in the case of no conflict, the embodiments of this application and the features in the embodiments could be combined randomly with each other.

Embodiment One

Available resources in the second control area in the RB are as shown in the figure.

The eREG, as a basic resource unit, is further divided into 4 Resource sets.

Figure 5A:
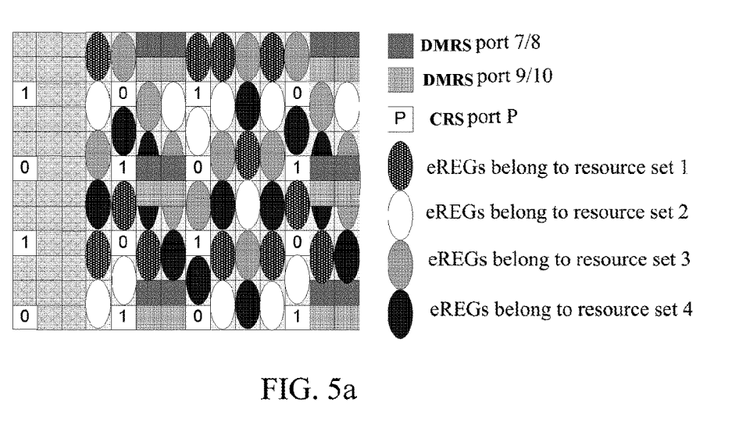
FIGS. 5a and 5b are diagrams of two kinds of division modes of resource sets.
Figure 5B:
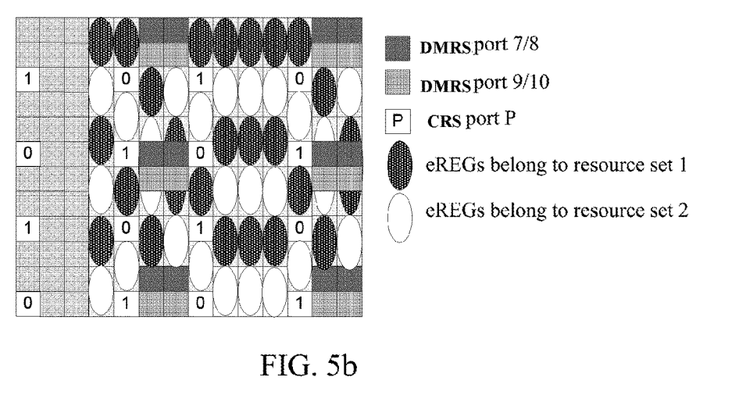

As shown in FIG. 5, the eREG is comprised of two REs which are adjacent in the frequency domain, wherein, being adjacent in the frequency domain refers to being adjacent in the frequency domain with the absence of the pilot RE.

In the present embodiment, assuming that a, b, c and d are 7, 9, 8 and 10, then the UE performs demodulation according to the corresponding relationships between the ports and the resource sets in table 2 below.

TABLE 2

|  |  | Number of resource sets occupied by the UE in the RB | | |
|---|---|---|---|---|
|  |  | 1 Resource Set | 2 Resource Sets |  |
| Closed-loop precoding | Resource Set 1 | Port 7 | Port 7 or 9 | Port 7 or 8 |
|  | Resource Set 2 | Port 9 |  |  |

TABLE 2-continued

| | | |
|---|---|---|
| Resource Set 3 | Port 8 | Port 10 or 8 |
| Resource Set 4 | Port 10 | |

| | | Number of eREGs occupied by one ePDCCH in a pair of RBs | |
|---|---|---|---|
| | | non-empty | empty |
| Transmission diversity | eREGs in resource sets 1 and 2 | Ports 7 and 9 | Ports 7 and 9 or Ports 8 and 10 |
| | eREGs in resource sets 3 and 4 | Ports 8 and 10 | |

If the base station transmits the control signaling of UE 1 on resource set 1, the resource allocated to the UE 1 is one resource set. As port 7 corresponds to resource set 1 in the above corresponding relationship table 2, port 7 is used for demodulation. The control signaling of UE 1 and port 7 use the same pre-coding.

If the base station transmits the control signaling of UE 2 on resource set 2, UE 2 performs demodulation according to the above corresponding relationship table 2. As port 9 corresponds to resource set 2, port 9 is used for demodulation. The control signaling of UE 2 and port 9 use the same pre-coding.

The base station transmits the control signaling of UEs 3, 4, 5 and 6 on part or all of eREGs of resource sets 3 and 4, and UEs 3, 4, 5 and 6 use the transmission diversity technology, such as the SFBC technology. All UEs using the SFBC do not need the DMRS port precoding, and fixedly use 2 ports, which are ports 8 and 10 here.

Embodiment Two

Available resources in the second control area in the RB are as shown in FIG. 5. The eREG, as a basic resource unit, is further divided into 4 resource sets (the same as embodiment one). Wherein, the eREG is comprised of two REs which are adjacent in the frequency domain, wherein, being adjacent in the frequency domain refers to being adjacent in the frequency domain with the absence of the pilot RE.

In the present embodiment, assuming that a, b, c and d are 7, 9, 8 and 10, then the UE performs demodulation according to the corresponding relationships between the ports and the sets in table 2.

If the base station transmits the control signaling of UE 1 on resource sets 1 and 2, the resources allocated to the UE 1 are two resource sets. As a port corresponding to sets 1 and 2 is port 7 or port 9, whether it is port 7 or port 9 may be pre-fixed or indicated by the base station through the signaling configuration. As an example, assume that port 7 is used here. Therefore, both resource sets 1 and 2 allocated to the UE use port 7 for demodulation. The control signaling of UE 1 and port 7 use the same pre-coding.

The base station transmits the control signaling of UEs 3, 4, 5 and 6 on part or all of eREGs of resource sets 3 and 4, and UEs 3, 4, 5 and 6 use the transmission diversity technology, such as the SFBC technology. All UEs using the SFBC technology do not need the DMRS port precoding, and fixedly use 2 ports, which are ports 8 and 10 here.

Embodiment Three

Available resources in the second control area in the RB are as shown in FIG. 5. The eREG, as a basic resource unit, is further divided into 4 resource sets (the same as embodiment one). Wherein, the eREG is comprised of two REs which are adjacent in the frequency domain, wherein, being adjacent in the frequency domain refers to being adjacent in the frequency domain with the absence of the pilot RE.

In the present embodiment, if the base station transmits the control signaling of UE 1 on resource set 3, the resource allocated to the UE 1 is one resource set. As port 8 corresponds to resource set 3, resource set 3 allocated to UE 1 uses port 8 for demodulation. The control signaling of UE 1 and port 8 use the same pre-coding.

The base station transmits the control signaling of UEs 2 and 3 on part or all of eREGs of resource sets 1 and 2, and UEs 2 and 3 use the transmission diversity technology, such as the SFBC technology. All UEs using the SFBC do not need the DMRS port precoding, and fixedly use 2 ports, which are ports 7 and 9 here.

In addition, in the above embodiment, a, b, c and d in the corresponding relationship table 1 between the locations of the transmission resources and the demodulation pilots may be 7, 8, 9, 10; or 7, 9, 8, 10; or 8, 7, 10, 9; or 9, 7, 10, 8; or 9, 10, 7, 8; or 8, 10, 7, 9; or 10, 9, 8, 7; or 10, 8, 9, 7, etc.

Embodiment Four

In a condition of allocating the same number of resource sets in different RBs, there are different corresponding relationships between the pilot resources and the resource sets in the different RBs, as shown in table 3 or 4 below for example.

TABLE 3

| | RB1 Number of resource sets occupied by one ePDCCH in a pair of RBs | | RB2 Number of resource sets occupied by one ePDCCH in a pair of RBs | | RB3 Number of resource sets occupied by one ePDCCH in a pair of RBs | | RB4 Number of resource sets occupied by one ePDCCH in a pair of RBs | |
|---|---|---|---|---|---|---|---|---|
| | 1 | 2 | 1 | 2 | 1 | 2 | 1 | 2 |
| Resource Set 1 | Port a | Port a | Port b | Port b | Port a | Port a | Port b | Port b |
| Resource Set 2 | Port b | | Port a | | Port b | | Port a | |
| Resource Set 3 | Port c | Port d | Port d | Port c | Port c | Port d | Port d | Port c |
| Resource Set 4 | Port d | | Port c | | Port d | | Port c | |

TABLE 4

| | RB1 Number of resource sets occupied by one ePDCCH in a pair of RBs | | RB2 Number of resource sets occupied by one ePDCCH in a pair of RBs | | RB3 Number of resource sets occupied by one ePDCCH in a pair of RBs | | RB4 Number of resource sets occupied by one ePDCCH in a pair of RBs | |
|---|---|---|---|---|---|---|---|---|
| | 1 | 2 | 1 | 2 | 1 | 2 | 1 | 2 |
| Resource Set 1 | Port a | Port a | Port b | Port b | Port c | Port d | Port d | Port c |
| Resource Set 2 | Port b | | Port a | | Port d | | Port c | |
| Resource Set 3 | Port c | Port d | Port d | Port c | Port a | Port 7 | Port b | Port b |
| Resource Set 4 | Port d | | Port c | | Port b | | Port a | |

Wherein, a, b, c and d in tables 3 and 4 respectively are 7, 9, 8 and 10 or 7, 8, 9 and 10 or 8, 7, 10 and 9 etc.

In connection with the above tables 3 and 4, in different RBs, there are different corresponding relationships between the pilot resources and the resource sets, which specifically may be that there are different corresponding relationships between the pilot resources and the resource sets in adjacent RBs. For example, as shown in table 3, there may be totally 2 different corresponding relationships, and an odd RB and an even RB respectively use one of the corresponding relationships; in addition, as shown in table 4, there may also be 4 different corresponding relationships. With the above method, the interference may further be randomized.

Embodiment Five

In a condition of allocating the same number of resource sets in different RBs, there are different corresponding relationships between the pilot resources and the resource sets in the different subframes, as shown in table 5 or 6 below for example.

TABLE 5

| | TTI1 Number of resource sets occupied by one ePDCCH in a pair of RBs | | TTI2 Number of resource sets occupied by one ePDCCH in a pair of RBs | | TTI3 Number of resource sets occupied by one ePDCCH in a pair of RBs | | TTI4 Number of resource sets occupied by one ePDCCH in a pair of RBs | |
|---|---|---|---|---|---|---|---|---|
| | 1 | 2 | 1 | 2 | 1 | 2 | 1 | 2 |
| Resource Set 1 | Port a | Port a | Port b | Port b | Port a | Port a | Port b | Port b |
| Resource Set 2 | Port b | | Port a | | Port b | | Port a | |
| Resource Set 3 | Port c | Port d | Port d | Port c | Port c | Port d | Port d | Port c |
| Resource Set 4 | Port d | | Port c | | Port d | | Port c | |

Wherein, a, b, c and d in tables 5 and 6 respectively are 7, 9, 8 and 10 or 7, 8, 9 and 10 or 8, 7, 10 and 9 etc. In connection with the above tables 5 and 6, in different subframes, there are different corresponding relationships between the pilot resources and the resource sets, which specifically may be that there are different corresponding relationships between the pilot resources and the resource sets in adjacent subframes. For example, as shown in table 5, there may be totally 2 different corresponding relationships and the corresponding relationships in an odd subframe and an even subframe respectively are different; in addition, as shown in table 6, there may also be 4 different corresponding relationships. With the above method, the interference may further be randomized.

Embodiment Six

Figure 6:
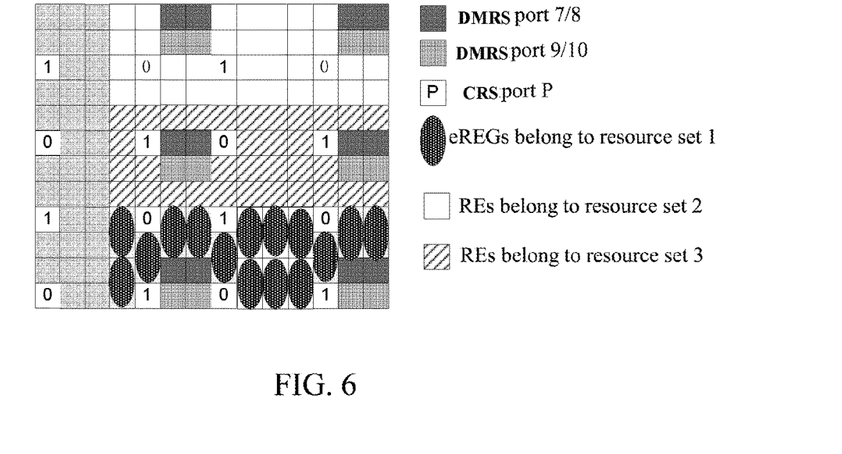
FIG. 6 is a diagram of another division mode of resource sets.

As shown in FIG. 6, the eREG, as a basic resource unit, is further divided into two resource sets. Wherein, the eREG is comprised of two REs which are adjacent in the frequency

TABLE 6

| | TTI1 Number of resource sets occupied by one ePDCCH in a pair of RBs | | TTI2 Number of resource sets occupied by one ePDCCH in a pair of RBs | | TTI3 Number of resource sets occupied by one ePDCCH in a pair of RBs | | TTI4 Number of resource sets occupied by one ePDCCH in a pair of RBs | |
|---|---|---|---|---|---|---|---|---|
| | 1 | 2 | 1 | 2 | 1 | 2 | 1 | 2 |
| Resource Set 1 | Port a | Port a | Port b | Port b | Port c | Port d | Port d | Port c |
| Resource Set 2 | Port b | | Port a | | Port d | | Port c | |
| Resource Set 3 | Port c | Port d | Port d | Port c | Port a | Port a | Port b | Port b |
| Resource Set 4 | Port d | | Port c | | Port b | | Port a | | domain, wherein, being adjacent in the frequency domain refers to being adjacent in the frequency domain with the absence of the pilot RE.

The base station transmits the control signaling of UE 1 on resource set 1, and the UE performs demodulation according to the following corresponding relationship table 7.

TABLE 7

|  | one resource set occupied by the UE in the RB | |
| --- | --- | --- |
| Closed-loop precoding | Resource Set 1 | Port a |
|  | Resource Set 2 | Port c |
| Transmission diversity | Resource Set 1 | Ports a, b |
|  | Resource Set 2 | Ports c, d |

Assuming that a, b, c and d are 7, 8, 9 and 10, then it is to refer to table 8 below.

TABLE 8

|  | one resource set occupied by the UE in the RB | |
| --- | --- | --- |
| Closed-loop precoding | Resource Set 1 | Port 7 |
|  | Resource Set 2 | Port 9 |
| Transmission diversity | Resource Set 1 | Ports 7, 8 |
|  | Resource Set 2 | Ports 9, 10 |

Assuming that a, b, c and d are 7, 9, 8 and 10, then it is to refer to table 9 below.

TABLE 9

|  | one resource set occupied by the UE in the RB | |
| --- | --- | --- |
| Closed-loop precoding | Resource Set 1 | Port 7 |
|  | Resource Set 2 | Port 8 |
| Transmission diversity | Resource Set 1 | Ports 7, 9 |
|  | Resource Set 2 | Ports 8, 10 |

7, 9, 8 and 10 are taken as an example of a, b, c and d. If the base station transmits the control information of UE 1 on resource set 1, and uses a precoding technology, UE demodulates the control information based on port 7 according to the corresponding relationships in the above table 9; and if the base station transmits control information of UE 2 and UE3 on part or all of eREGs on resource set 2, and uses a diversity technology, UE 2 and UE3 demodulate the control signaling based on port 8 and port 10.

Embodiment Seven

Figure 7:
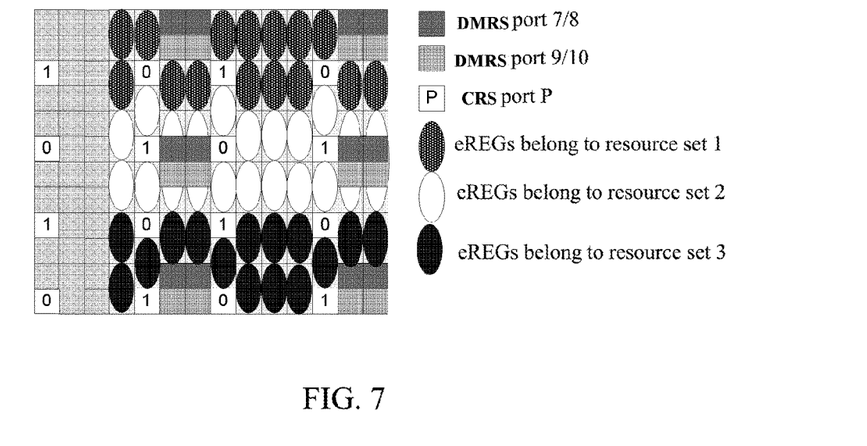
FIG. 7 is a diagram of another division mode of resource sets.

Except for the modes illustrated in the above embodiments, there are other modes for division of the resource sets, as shown in FIGS. 6 and 7.

In addition, the embodiments of the present document further provide a control signaling transmission system, applied in a base station, comprising: a transmission resource mapping module and a control signaling transmission module, wherein, the transmission resource mapping module is configured to transmit control signaling using different transmission technologies on available transmission resources in a second control signaling transmission area in the same RB; wherein, the different transmission technologies include a dedicated demodulation pilot based single-layer transmission technology and a diversity technology; and the control signaling transmission module is configured to transmit the control signaling to a UE.

The transmission resource mapping module is configured to perform mapping by means of:

controlling signaling of one or more UEs using the diversity technology sharing two of pilot ports, port7, port8, port9 and port10, as demodulation pilot ports of the controlling signaling; and controlling signaling of one or more UEs using the dedicated demodulation pilot based single-layer transmission technology sharing one or both of remaining two of pilot ports, port7, port8, port9 and port10, as demodulation pilot ports of the controlling signaling.

The transmission resource mapping module is further configured to divide the available transmission resources in the second control signaling transmission area in the RB into a plurality of resource sets, allocate one or more resource sets to each UE, and map the control signaling of the UEs onto the resource sets allocated to the UEs.

In addition, the embodiments of the present document further provide a terminal, comprising a channel detection module and a control signaling demodulation module, wherein, the channel detection module is configured to detect occupied transmission resources in a Resource Block (RB); and the control signaling demodulation module is configured to demodulate control signaling transmitted by the base station on the transmission resources in a second control signaling transmission area in the RB according to corresponding relationships between the occupied transmission resources and pilot ports.

The corresponding relationships between the occupied transmission resources and the pilot ports are the following corresponding relationships between the occupied resource sets and the pilot ports:

when the transmission is performed using a dedicated demodulation pilot based single-layer transmission technology, if the UE occupies one resource set in the RB, the occupied resource sets 1, 2, 3 and 4 correspond to port a, port b, port c and port d respectively; and if the UE occupies two resource sets in the RB, the occupied resource sets 1 and 2 correspond to port a or port b, and the occupied resource sets 3 and 4 correspond to port d or port c;

wherein, a, b, c and d are one of pilot port numbers 7, 8, 9 and 10 respectively, and are different from each other.

The corresponding relationships between the occupied transmission resources and the pilot ports are the following corresponding relationships between the occupied resource sets and the pilot ports:

when the diversity technology is used, if not all the transmission resources in the resource sets 1 and 2 are occupied, the occupied resource sets 1 and 2 correspond to port a and port b respectively; and if not all the transmission resources in the resource sets 3 and 4 are occupied, the occupied resource sets 3 and 4 correspond to port c and port d respectively; and when the diversity technology is used, if all the transmission resources in the resource sets 1 and 2 are occupied, the occupied resource sets 1 and 2 correspond to port a and port b, or port c and port d respectively; and if all the transmission resources in the resource sets 3 and 4 are occupied, the occupied resource sets 3 and 4 correspond to port a and port b, or port c and port d respectively;

wherein, a, b, c and d are one of pilot port numbers 7, 8, 9 and 10 respectively, and are different from each other.

When the diversity technology is used, if all the transmission resources in the resource sets 1 and 2 are occupied, the UE determines whether the occupied resource sets 1 and 2 correspond to port a and port b, or port c and port d respectively according to an indication from the base station; and if all the transmission resources in the resource sets 3 and 4 are occupied, the UE determines whether the occupied resource sets 3 and 4 correspond to port a and port b, or port c and port d respectively according to an indication from the base station.

The control signaling demodulation module is further configured to demodulate control signaling in different RBs according to different corresponding relationships between the pilot resources and resource sets.

The control signaling demodulation module is further configured to demodulate control signaling in different subframes according to different corresponding relationships between the pilot resources and resource sets.

The above description is only the preferred embodiments of the present document and it is not intended to limit the present document, and the present document can also have a variety of other embodiments. Without departing from the spirit and essence of the present document, those skilled in the art can make various corresponding changes and variations according to the present document, but all these corresponding changes and variations should belong to the protection scope of the appended claims in the present document.

Obviously, those skilled in the art should understand that each module or each step of the aforementioned present document can be implemented with general computing devices, and can be integrated in a single computing device, or distributed onto a network consisting of multiple computing devices; alternatively, they can be implemented with program codes executable by the computing devices, and therefore, they can be stored in storage devices to be executed by the computing devices; and in some cases, steps illustrated or described may be implemented in an order different from the order herein, or they are respectively made into multiple integrated circuit modules; alternatively, it is implemented with making several modules or steps of them into a single integrated circuit module. Thus, the present document is not limited to any specific combinations of hardware and software.

INDUSTRIAL APPLICABILITY

The present document proposes a control signaling transmission and demodulation method scheme, which, by configuring pilot ports and dividing the transmission resources in the second control signaling transmission area in the RB, implement transmission of the control signaling of multiple UEs of different transmission technologies on the available transmission resources in the same RB, thus fully utilizing the transmission resources in the RB, improving resource utilization rate, enhancing control signaling capacity, and supporting the control signaling of more users.

What is claimed is:

1. A control signaling demodulation method, comprising:
  a User Equipment (UE) detecting occupied transmission resources in a Resource Block (RB), and demodulating control signaling transmitted by a base station on the transmission resources in a control channel area in the RB according to corresponding relationships between the occupied transmission resources and pilot ports,
  wherein the control channel area in the RB is divided into one or more resource sets; and
  the corresponding relationships between the occupied transmission resources and the pilot ports are determined by multiple different assumptions on a total number of occupied resource sets in one RB,
  when the total number of occupied resource sets in one RB is 1, one occupied resource set corresponds to one pilot port, and the relationship between the occupied resource set and pilot port is not fixed;
  when the total number of occupied resource sets in one RB is 2, two occupied resource set corresponds to one pilot port, and the relationship between the occupied resource set and pilot port is not fixed;
  when the total number of occupied resource sets in one RB is 4, four occupied resource set corresponds to one pilot port, and the relationship between the occupied resource set and pilot port is not fixed.

2. The method according to claim 1, wherein,
  the base station divides the available transmission resources in the enhanced control channel area in Release 11 in the RB into one or more resource sets; and
  in a condition of allocating a same number of resource sets in different RBs, there are different corresponding relationships between pilot resources and the resource sets in the different RBs.

3. The method according to claim 2, wherein,
  that there are following different corresponding relationships between the pilot resources and the resource sets in the different RBs refers to that:
  the corresponding relationships between the pilot resources and the resource sets in adjacent RBs are different.

4. The method according claim 1, wherein,
  the base station divides the available transmission resources in the enhanced control channel area in Release 11 in the RB into one or more resource sets; and
  in a condition of allocating a same number of resource sets in different subframes, there are different corresponding relationships between pilot resources and the resource sets in the different subframes.

5. The method according to claim 4, wherein,
  that there are following different corresponding relationships between the pilot resources and the resource sets in the different subframes refers to that
  the corresponding relationships between the pilot resources and the resource sets in adjacent subframes are different.

6. A terminal, comprising a processor and a storage device, wherein the storage device stores processor-executable programs that, when executed by the processor, cause the processor to perform steps of:
  detecting occupied transmission resources in a Resource Block (RB); and
  demodulating control signaling transmitted by a base station on the transmission resources in a control channel area in the RB according to corresponding relationships between the occupied transmission resources and pilot ports,
  wherein the control channel area in the RB is divided into one or more resource sets; and the corresponding relationships between the occupied transmission resources and the pilot ports are determined by multiple different assumptions on a total number of occupied resource sets in one RB, when the total number of occupied resource sets in one RB is 1, one occupied resource set corresponds to one pilot port, and the relationship between the occupied resource set and pilot port is not fixed;

when the total number of occupied resource sets in one RB is 2, two occupied resource set corresponds to one pilot port, and the relationship between the occupied resource set and pilot port is not fixed;

when the total number of occupied resource sets in one RB is 4, four occupied resource set corresponds to one pilot port, and the relationship between the occupied resource set and pilot port is not fixed.

7. The terminal according to claim 6, wherein, the corresponding relationships between the occupied transmission resources and the pilot ports are the following corresponding relationships between the occupied resource sets and the pilot ports:

when a diversity technology is used, if not all the transmission resources in the resource sets 1 and 2 are occupied, the occupied resource sets 1 and 2 correspond to the port a and the port b respectively; and if not all the transmission resources in the resource sets 3 and 4 are occupied, the occupied resource sets 3 and 4 correspond to the port c and the port d respectively; and when the diversity technology is used, if all the transmission resources in the resource sets 1 and 2 are occupied, the occupied resource sets 1 and 2 correspond to the port a and the port b, or the port c and the port d respectively; and if all the transmission resources in the resource sets 3 and 4 are occupied, the occupied resource sets 3 and 4 correspond to the port a and the port b, or the port c and the port d respectively;

wherein, the a, b, c and d are one of the pilot port numbers 7, 8, 9 and 10 respectively, and are different from each other.

8. The terminal according to claim 6, wherein, when the diversity technology is used, if all the transmission resources in the resource sets 1 and 2 are occupied, the UE determines whether the occupied resource sets 1 and 2 correspond to the port a and the port b, or the port c and the port d respectively according to an indication from the base station; and if all the transmission resources in the resource sets 3 and 4 are occupied, the UE determines whether the occupied resource sets 3 and 4 correspond to the port a and the port b, or the port c and the port d respectively according to an indication from the base station.

9. The terminal according to claim 6, wherein, the control signaling demodulation module is further configured to demodulate control signaling in different RBs according to different corresponding relationships between pilot resources and the resource sets.

10. The terminal according to claim 6, wherein, the control signaling demodulation module is further configured to demodulate control signaling in different subframes according to different corresponding relationships between pilot resources and the resource sets.

11. The method according to claim 1, wherein, the control channel area in the RB into 4 resource sets, and the corresponding relationships between the occupied transmission resources and the pilot ports are that when the transmission is performed using a dedicated demodulation pilot based single-layer transmission technology, if the UE occupies one resource set in the RB, the occupied resource sets 1, 2, 3 and 4 correspond to a port a, a port b, a port c and a port d respectively; and if the UE occupies two resource sets in the RB, the occupied resource sets 1 and 2 correspond to the port a or the port b, and the occupied resource sets 3 and 4 correspond to the port d or the port c;

wherein, the a, b, c and d are one of pilot port numbers 7, 8, 9 and 10 respectively, and are different from each other.

12. The terminal according to claim 6, wherein, the corresponding relationships between the occupied resource sets and the pilot ports are as follows:

when the transmission is performed using a dedicated demodulation pilot based single-layer transmission technology, if the UE occupies one resource set in the RB, the occupied resource sets 1, 2, 3 and 4 correspond to a port a, a port b, a port c and a port d respectively; and if the UE occupies two resource sets in the RB, the occupied resource sets 1 and 2 correspond to the port a or the port b, and the occupied resource sets 3 and 4 correspond to the port d or the port c;

wherein, the a, b, c and d are one of pilot port numbers 7, 8, 9 and 10 respectively, and are different from each other.

* * * * *